T. E. MURRAY.
VEHICLE WHEEL.
APPLICATION FILED APR. 5, 1921.
1,405,617.
Patented Feb. 7, 1922.
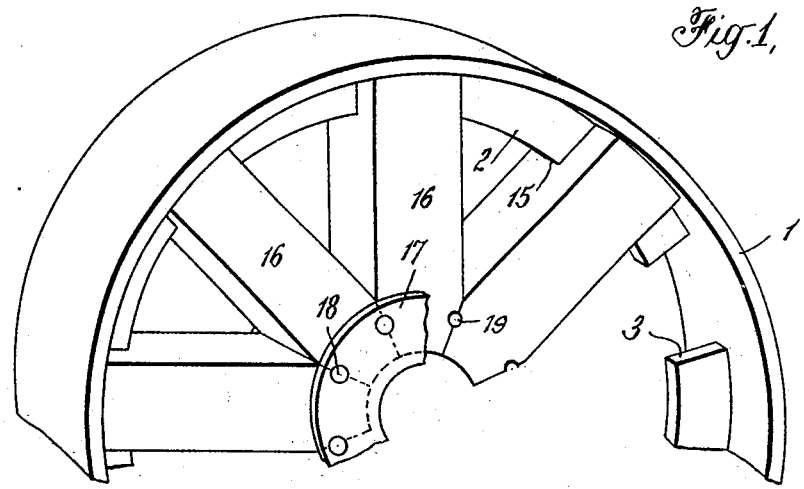
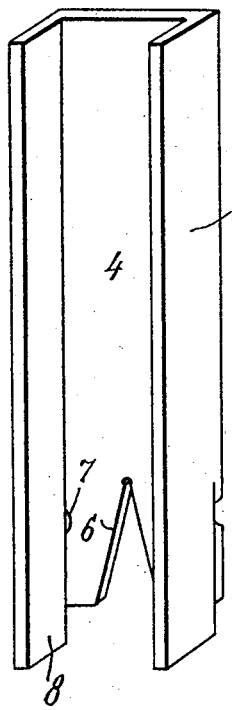
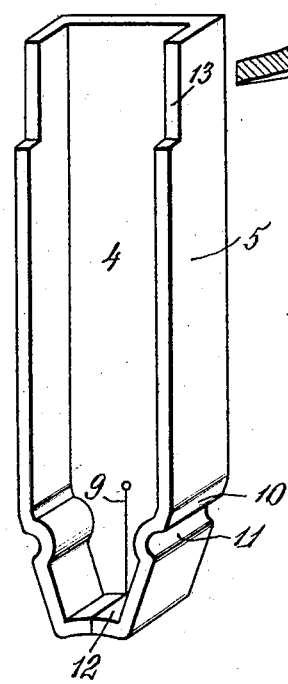
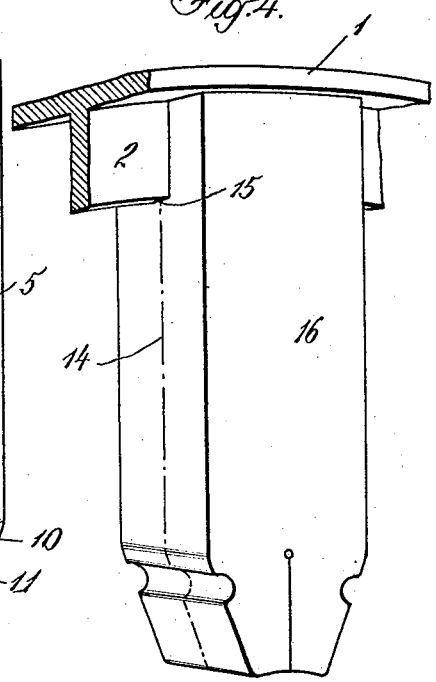

UNITED STATES PATENT OFFICE.

THOMAS E. MURRAY, OF BROOKLYN, NEW YORK.

VEHICLE WHEEL.

1,405,617.     Specification of Letters Patent.     Patented Feb. 7, 1922.

Application filed April 5, 1921. Serial No. 458,775.

*To all whom it may concern:*

Be it known that I, THOMAS E. MURRAY, a citizen of the United States, and resident of Brooklyn, county of Kings, and State of New York, have invented certain new and useful Improvements in Vehicle Wheels, of which the following is a specification.

My invention aims to provide an improved wheel made largely or entirely of metal which shall have great strength and be capable of economical production.

The accompanying drawings illustrate an embodiment of the invention.

Fig. 1 is a segment of approximately one-half the circumference of a felloe and spokes of the complete wheel. The remaining figures illustrate the method of production of the spokes; Figs. 2, 3 and 4 illustrating respectively different stages of the process.

Referring to the wheel illustrated, the felloe consists of a plate 1 with an inside central longitudinal rib 2, the whole being made of an ordinary T-bar of suitable steel bent around into circular shape with its ends welded together. At one part of the circumference the rib 2 is cut away to form a notch 3 for a purpose hereinafter explained.

The spokes are made from channel bars of suitable steel of the cross-section illustrated, for example in the upper part of Fig. 2, with a web 4 and side flanges 5 of equal width. Two of these channels are united along the edges of their flanges to make a spoke, the inner ends being first bent in to fit together as shown in Fig. 1.

Referring again to Fig. 2 the web of the channel is cut out to form a V-shaped notch 6 at the center and curved notches 7 at the edges. The web is also cut off at this end so as to leave projecting portions 8 of the two flanges.

In succeeding operations this end of the channel is bent in to close the notch 6 and reduce it to a slit 9, Fig. 3, to taper the sides or flanges as at 10, to form half round sockets 11 on the outside and to bend up the projecting ends of the flanges to form transverse plates 12 which meet and close the end of the channel in a circular shape. Also the upper ends of the flanges are cut out to form rectangular notches 13. The several cutting and bending operations described may be performed in various orders and one or more of them simultaneously, as may be convenient.

The product constitutes half of a spoke. Two such halves are then placed together with the edges of the flanges meeting and these flanges are welded together along the line 14, Fig. 4, to form a complete spoke with a properly shaped inner end and with a notch 15 at its outer end formed by the two notches 13 in the facing halves.

The spokes thus formed, designated as a whole by the numeral 16, are then assembled within the felloe, with the notches 15 embracing the flange 2, the ends of the spokes bearing against the inside face of the plate 1 and the width of the spokes being nearly equal to that of the plate. The insertion of the spokes is facilitated by the notch 3, which may be afterwards closed by inserting a suitable filler. Or the last spoke may be made without a notch 15 and held within the notch 3 of the felloe so as to prevent relative circumferential movement. The taper on the inner ends of the spokes is such as to bring these ends into close contact with one another. The usual closing plate 17 will then be applied over the ends of the spokes, one on the inner face and another on the outer face, and united by bolts passing through holes 18 in the plates which register with bolt holes 19 formed by the opposed semi-circular notches 11 in the side faces of the spokes.

A wheel of this type can be very cheaply made from common steel shapes. It has abundant strength at the inner ends of the spokes to sustain the strains in an axial direction which are always very severe on this part of the wheel. The sides of the spokes, formed with the flanges 5 and tapered portions 10, are of maximum depth and contribute great stiffness and strength in this direction. The transverse faces of the inner or hub ends of the spokes, that is the faces transverse to the axis of the wheel, are continuations of the transverse faces of the outer portions of the spokes. The axial faces 10 of the hub ends of the spokes are bent inward from the corresponding faces 5 of the outer portions of such spokes. Subject to the limitations of space as we approach the center of the wheel, we have the metal distributed so as to secure the maximum strength at the hub ends and also from such ends outward; and this is secured by very simple bending operations from ordinary commercial channel shapes which are cheaply and easily obtained. The wheel illustrated is particularly intended for automobile trucks, but the same construction is adapted to vehicles of various other types by using thin sheet metal.

The closure 12 of the inner end of each half spoke may be made in various other ways, as by a separate inserted piece, or by bending up from the web 4 of the channel.

The flange 2 may be made continuous around the felloe, without the notch 3. In that case, the last of the spokes to be put in would have to be introduced in two separate halves from opposite sides, welded together along the line 14, Fig. 4, after they are in place.

The style of felloe shown may be used also in combination with other styles of spoke than that illustrated. For example, the spokes could be of channel shape, somewhat like Fig. 3, with the flanges 5 constituting the full thickness of the spoke and with notches at the upper ends of such flanges embracing the flange 2 of the felloe. And in fact, various other designs of spoke may be substituted.

Though I have described with great particularity of detail a specific embodiment of my invention, yet it is not to be understood therefrom that the invention is restricted to the particular embodiment disclosed. Various modifications thereof in detail and in the arrangement of the parts and in the method of forming them may be made by those skilled in the art without departure from the invention as defined in the following claims.

What I claim is:—

1. A vehicle wheel having spokes each made of a pair of channel sections each section having a flat web and side flanges at right angles thereto, said sections being united along the edges of their flanges.

2. A vehicle wheel having spokes of substantially rectangular cross-section, with hub ends which have transverse faces in continuation of the transverse faces of the outer portions of the spokes and which have axial faces bent inward from the corresponding faces of the outer portions and contacting with each other.

3. A vehicle wheel having spokes each made of a pair of channel sections each section having a flat web and side flanges at right angles thereto, said sections being united along the edges of their flanges, said web being cut away and being notched at its edges and said flanges being bent in at the inner end of the spoke to provide substantially radial faces with concave sockets for the passage of bolts in an axial direction in the assembled wheel.

4. A vehicle wheel having spokes each made of a pair of channel sections united along the edges of their flanges, and a felloe having an inside flange, said spokes having their flanges cut away to form notches in their outer ends embracing said flange.

5. A vehicle wheel having spokes each made of a pair of channel sections united along the edges of their flanges, and a felloe having an inside flange with a notch therein through which the spokes can pass, and the spokes having notches in their outer ends embracing said flange.

In witness whereof, I have hereunto signed my name.

THOMAS E. MURRAY.